United States Patent
Beketov et al.

(10) Patent No.: US 9,133,307 B1
(45) Date of Patent: Sep. 15, 2015

(54) METHOD FOR PRODUCING MODIFIED POLYMERIC SULFUR

(71) Applicants: Kairat Mirzasalimovich Beketov, Almaty (KZ); Marat Flurovich Faskhutdinov, Almaty (KZ)

(72) Inventors: Kairat Mirzasalimovich Beketov, Almaty (KZ); Marat Flurovich Faskhutdinov, Almaty (KZ)

( * ) Notice: Subject to any disclaimer, the term of this patent is extended or adjusted under 35 U.S.C. 154(b) by 0 days.

(21) Appl. No.: 14/490,689

(22) Filed: Sep. 19, 2014

(51) Int. Cl.
*C08G 75/00* (2006.01)
*C04B 28/36* (2006.01)

(52) U.S. Cl.
CPC ............ *C08G 75/00* (2013.01); *C04B 28/36* (2013.01)

(58) Field of Classification Search
CPC ........ C04B 28/36; C04B 14/02; C04B 24/00; C04B 40/00; C08G 75/00; C08G 75/14
USPC ............ 524/842, 788, 789, 881; 528/290, 90, 528/223, 143, 23
See application file for complete search history.

(56) References Cited

U.S. PATENT DOCUMENTS

| | | | |
|---|---|---|---|
| 4,155,771 A | 5/1979 | Cassar | |
| 4,190,460 A | 2/1980 | Cassar | |
| 4,311,826 A | 1/1982 | McBee et al. | |
| 4,348,313 A | 9/1982 | McBee et al. | |
| 4,391,969 A | 7/1983 | McBee et al. | |
| 7,833,341 B2 | 11/2010 | Antens et al. | |
| 8,323,395 B2 | 12/2012 | Verbist et al. | |
| 8,535,433 B2 | 9/2013 | Boer et al. | |
| 8,545,616 B2 | 10/2013 | Lankshear et al. | |
| 8,623,130 B2 | 1/2014 | De Boer et al. | |
| 2010/0242807 A1 | 9/2010 | Boer et al. | |

FOREIGN PATENT DOCUMENTS

KZ  29394 A4  12/2014

*Primary Examiner* — Shane Fang

(57) ABSTRACT

The present invention relates to a method for producing a modified polymeric sulfur comprising melting thereof in a reactor and mixing with addition of modifiers, wherein 1-35 parts by weight of carbohydrate caramelization products of general formula:

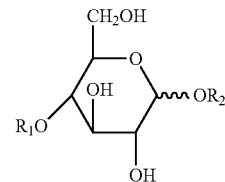

wherein $R_1$, $R_2$=H, Glc, Fru,
are added to 65-99 parts by weight of molten technical sulfur at constant mixing,
the temperature of the mixture is increased to 150-200° C., maintained for 2-4 hours, then the temperature is decreased to 5-25° C. and maintained until solidification of the modified sulfur is complete.

2 Claims, No Drawings

METHOD FOR PRODUCING MODIFIED POLYMERIC SULFUR

The use of sulfur in the manufacture of building materials has been suggested after the First World War, for example, acid resistant mortar comprising 40% of molten sulfur as a binder mixed with 60% of sand. The use of sulfur as a binder in a mixture with crushed stone or gravel in the production of concrete was previously studied, and it was found that allotropic transition of sulfur into a denser orthorhombic form occurs in these concretes after solidification of sulfur, that leads to deterioration of the mechanical strength of sulfur concrete. Modification of sulfur is the main way to improve the strength of sulfur concretes and sulfur asphalts.

Good results of sulfur modification with unsaturated (non-saturated) hydrocarbons, styrene, vinyltoluene, and particularly with dicyclopentadiene have been achieved.

Currently, regarding the use of sulfur, complex organoelemental compounds are patented as modifiers: organosilicon compounds U.S. Pat. No. 7,833,341, US20100242807, U.S. Pat. No. 8,535,433, U.S. Pat. No. 8,623,130, organotitanium compounds U.S. Pat. No. 8,323,395, U.S. Pat. No. 8,545,616. However, these compounds have complex structure and contribute greatly to the production cost of modified sulfur.

Simple nonsaturated compounds are preferred as modifiers of sulfur since they are produced on a large scale as monomers for production of polymers and they are low-cost.

Thus, U.S. Pat. No. 4,155,771 shows a possibility of sulfur modification with naphthalene derivatives. Mixtures of dicyclopentadiene with terpenes were used in U.S. Pat. No. 4,190,460.

However, the use of low molecular weight organic compounds as modifiers results in formation of accessory volatile organosulfur substances (thiols, sulfides) having disgusting odor at very low concentrations. Bad odor of sulfur binders limits their extensive use in the manufacture of building materials.

Close analogues of our invention are U.S. Pat. No. 4,311,826, U.S. Pat. No. 4,348,313, U.S. Pat. No. 4,391,969 using cyclopentadiene oligomers as a modifier, which allows to reduce the odor intensity of sulfur binder.

The main object of the present invention was to develop a technology for sulfur modification having low-cost and environmentally safe and for producing a sulfur binder with lower odor intensity relative to the analogues.

Technical effect of the method is achieved by the fact that carbohydrate caramelization products in an amount of 1-35 parts by weight are added to 65-99 parts by weight of molten technical sulfur, then the temperature is increased to 150-200° C. while mixing, maintained for 1-4 hours, then the mixture is supplied for granulating or cooled until monolith is formed, which is then crushed to the required fineness.

The method is implemented as follows.

Technical sulfur is first melted in a reactor maintaining the temperature of 125-140° C., a carbohydrate caramelization product is added, mixed and maintained until the modification reaction is complete. A product of heat treatment at 150-200° C. of carbohydrates with molecular weight of no more than 506 atomic units of general formula given below:

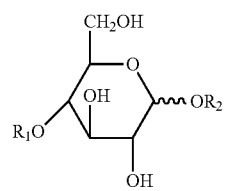

wherein $R_1$, $R_2$=H, Glc, Fru,
is used as a carbohydrate caramelization product.

Standard equipment is used to produce polymeric sulfur, and a process flow diagram may include a storage bunker for technical sulfur, a tray with heating elements, the pumps and dispensers, a stirred reactor with its heating and cooling system, a supply boiler and tanks for draining and cooling. Technical sulfur is supplied onto the heated tray, preheated before supplying through the dispenser into the reactor, wherein, being heated to a temperature of 125-130° C., it is mixed at a constant speed. Sulfur melt with temperature of 125-135° C. may be supplied to the reactor as well. A carbohydrate caramelization product in an amount of 1-35%, on the basis of the total amount of weight composition, is supplied into the reactor simultaneously with mixing and mixed for one hour. Then the temperature of the melt is brought to 150-200° C. without interruption of the mixing process and it is mixed for 1-4 hours. Thus, the total time of the mixing and melting process is 3-5 hours.

Then the modified sulfur melt is supplied from the reactor into the supply boiler, wherefrom it is then discharged into the tanks and cooled naturally to the temperature of the natural environment of 5-25° C. After cooling of the melt a monolith is formed. For further use, the obtained monolith of polymeric sulfur is ground on customer's request to a fineness of 0.5-1.0 mm, and packaged. It is possible to use the melt without cooling it when supplying into the mixer, for the preparation of sulfur-asphalt binder. Using more than 35 parts by weight of the carbohydrate caramelization product leads to increase of the cost and complication of the process of polymeric sulfur production. When introducing less than 1 part by weight of the carbohydrate caramelization product, the sulfur modification process proceeds incompletely. When the temperature is less than 125° C., the polymerization process does not take place.

In practice, the method of producing the modified sulfur is implemented as follows.

EXAMPLE 1

Pieces of technical sulfur are loaded into the reactor in an amount of 98 parts by weight, on the basis of the total weight. In the reactor, technical sulfur is heated up to its melting temperature of 125-130° C. Then 2 parts by weight of the carbohydrate caramelization product are added to the resulting melt at constant mixing. At constant mixing the temperature of the resulting melt is maintained within 125-130° C. for one hour. The next step of mixing without stopping the reactor is carried out when the temperature is increased to 150-200° C., and the mixing process lasts for 2-4 hours. Meantime, the polymerization of sulfur occurs, and the colour of the melt changes from yellow to dark brown. Thereafter the modified polymeric sulfur is discharged into the tanks and cooled at a temperature of 5-25° C. For further use, the obtained monolith of polymeric sulfur is ground to a fineness of 0.5-1.0 mm.

EXAMPLE 2

Pieces of technical sulfur are loaded into the reactor in an amount of 95 parts by weight, on the basis of the total weight.

In the reactor, technical sulfur is heated up to its melting temperature of 125-130° C. Then 5 parts by weight of the carbohydrate caramelization product are added to the resulting melt at constant mixing. At constant mixing, the temperature of resulting melt is maintained within 125-130° C. for one hour. The next step of mixing without stopping the reactor is carried out when the temperature is increased to 150-200° C., and the mixing process lasts for 2-4 hours. Meantime, the polymerization of sulfur occurs, and the colour of the melt changes from yellow to dark brown. Thereafter the modified polymeric sulfur is discharged into the tanks and cooled at a temperature of 5-25° C. For further use, the obtained monolith of polymeric sulfur is ground to a fineness of 0.5-1.0 mm.

Therefore, it is possible to produce modified sulfur for the manufacture of building materials and road pavements, wherein sulfur constituent in these materials and pavements may have greater specific gravity at ecological cleanliness of the production and lack unpleasant odor characteristic of volatile organosulfur compounds. The suggested process implies simplification of the production and obtaining of modified sulfur with decreased energy consumption for the production thereof due to optimization of the production. And modifiers are renewable, environmentally sound and cheap raw material having large-scale production.

The invention claimed is:

1. A method for producing a modified polymeric sulfur comprising melting thereof in a reactor and mixing with addition of modifiers, characterized in that 1-35 parts by weight of carbohydrate caramelization products of general formula:

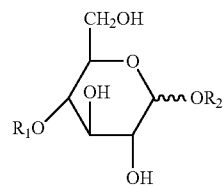

wherein $R_1$, $R_2$=H, Glc, Fru, are added to 65-99 parts by weight of molten technical sulfur at constant mixing, the temperature of the mixture is increased to 150-200° C., maintained for 2-4 hours, then the temperature is decreased to 5-25° C. and maintained until solidification of the modified sulfur is complete.

2. The method according to claim 1, characterized in that inorganic substances binding the volatile sulfur compounds selected from zinc oxide, phosphogypsum, metallurgical production slags, are further added into the liquid mass in an amount of 1-15 parts by weight for reducing odor of the produced modified sulfur.

* * * * *